(12) United States Patent
Majkrzak

(10) Patent No.: US 8,033,340 B2
(45) Date of Patent: Oct. 11, 2011

(54) WINDROWER AND METHOD OF WINDROWING A GROWN PRODUCT

(75) Inventor: David S. Majkrzak, West Fargo, ND (US)

(73) Assignee: Crary Industries, Inc., West Fargo, ND (US)

( * ) Notice: Subject to any disclaimer, the term of this patent is extended or adjusted under 35 U.S.C. 154(b) by 4 days.

(21) Appl. No.: 12/652,313

(22) Filed: Jan. 5, 2010

(65) Prior Publication Data

US 2011/0024139 A1 Feb. 3, 2011

Related U.S. Application Data

(60) Provisional application No. 61/273,539, filed on Aug. 3, 2009.

(51) Int. Cl.
*A01D 13/00* (2006.01)
(52) U.S. Cl. .......................................... 171/14; 56/327.1
(58) Field of Classification Search .................... 171/14, 171/23, 138, 110; 56/16.6, 327.1; 198/347.1, 198/347.4, 348, 360, 361, 369.2, 369; 414/252, 414/285, 350, 351, 365, 397, 480, 489, 523
See application file for complete search history.

(56) References Cited

U.S. PATENT DOCUMENTS

| | | | |
|---|---|---|---|
| 3,469,383 A * | 9/1969 | Manfre ........................ | 56/327.1 |
| RE29,121 E * | 1/1977 | Hook et al. ...................... | 171/58 |
| 6,068,059 A * | 5/2000 | Bajema et al. ................ | 171/130 |
| 6,591,145 B1 * | 7/2003 | Hoskinson et al. ............. | 700/28 |
| 7,789,166 B2 * | 9/2010 | Wallace ........................... | 171/14 |

* cited by examiner

*Primary Examiner* — Robert Pezzuto
(74) *Attorney, Agent, or Firm* — Wood, Phillips, Katz, Clark & Mortimer

(57) ABSTRACT

A windrower with a frame that: a) has a front, a rear and laterally spaced sides; and b) is movable in an advancing direction. A processing mechanism is capable of: a) unearthing grown product; and b) separating foreign matter from the grown product as the frame is advanced. A cross conveyor assembly controllably discharges grown product from the processing mechanism to the underlying terrain. The cross conveyor assembly has a first discharge end and at least one section, including the first discharge end, that is selectively translatable laterally relative to the frame as the frame is advancing thereby to laterally change a location of the first discharge end and thus the lateral discharge location for the cross conveyor assembly at the first discharge end.

21 Claims, 15 Drawing Sheets

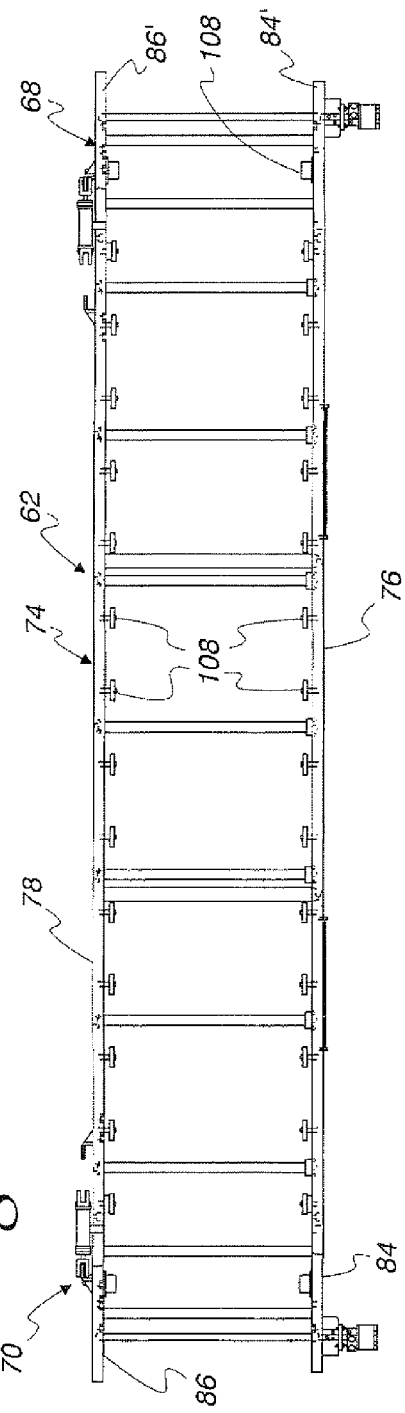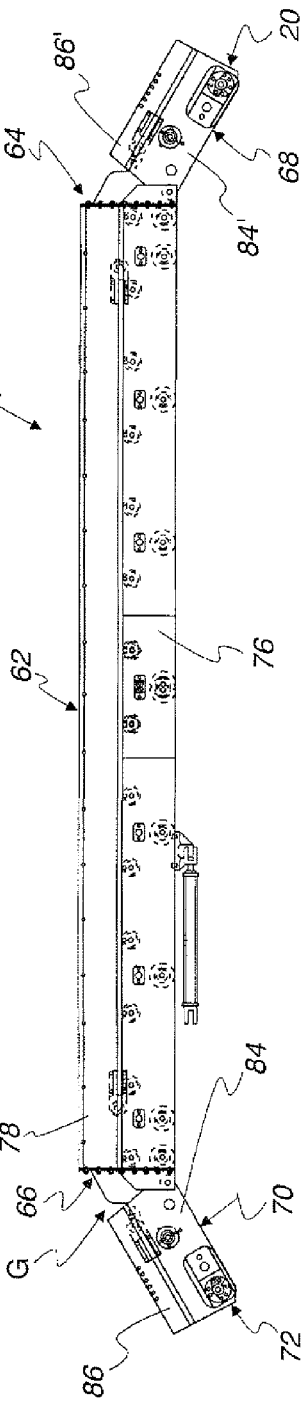

WINDROWER AND METHOD OF WINDROWING A GROWN PRODUCT

CROSS-REFERENCE TO RELATED APPLICATION

This application claims the benefit of the filing date of U.S. Provisional Application No. 61/273,539, filed Aug. 3, 2009, which is hereby incorporated by reference.

BACKGROUND OF THE INVENTION

1. Field of the Invention

This invention relates to windrowers for grown product and, more particularly, to a windrower having a cross conveyor for selectively discharging grown product at different lateral locations.

2. Background Art

Windrowers are used to dig grown product, such as potatoes, out of the ground and discharge an accumulation of the potatoes from multiple rows at one lateral location. Thereafter, the accumulated potatoes may be further windrowed or picked up by a harvester. Windrowing is carried out primarily to reduce the number of passes required by a harvester, that is more expensive, and requires more skill, to operate than a windrower.

Potatoes are normally planted in parallel rows spaced apart at uniform distances of 32-38 inches. Commonly a windrower will continuously simultaneously dig 2, 4 or 6 rows of potatoes as the windrower is advanced parallel to the rows.

Windrowers are generally constructed with components referred to as primary, secondary, and rear cross conveyors. The primary conveyor has blades that dig the potatoes out of the rows. The potatoes and any gathered soil are conveyed upwardly and oppositely to the advancing direction for the windrower during which some of the soil breaks away from the potatoes and deposits on the underlying terrain. The potatoes drop as they transfer from the primary conveyor to the secondary conveyor. This action tends to break up adhered dirt clods. Additional dirt separates as the potatoes are advanced upwardly and oppositely to the advancing direction for the windrower by the secondary conveyor. A third conveyor operates outside of the secondary conveyor and strips vines from the potatoes and dirt. The potatoes drop once again to the cross conveyor, as an incident of which further dirt dislodges from the potatoes. The cross conveyor directs the potatoes laterally for accumulated discharge between two adjacent rows next to the windrower. Precise lateral placement of the discharging potatoes between adjacent rows may require a lateral adjusting capability, for reasons explained below.

When potatoes are planted, oftentimes wheel markers or GPS steering are used to control movement of the towing vehicle/tractor and thereby maintain precise alignment between successive passes so that the row spacing does not deviate throughout an entire planting area. If wheel markers or GPS steering are not available, or otherwise not used, the spacing between a row formed on a subsequent pass may not be consistently spaced in relationship to the adjacent, outer row from an earlier pass. The first row on a pass, that is adjacent to the outer row on a prior pass, is referred to in the industry as a "guess row".

As the potatoes are discharged from the cross conveyor, they are commonly placed between the outer row of a prior pass and the guess row. If the guess row spacing deviates significantly and no adjustment to the lateral discharge location is effected, the potatoes may not be placed between rows where they would otherwise be picked up by a subsequent pass of a windrower or harvester.

It is generally not practical to compensate for this condition by steering the tractor to one side. That is because the tires on the tractor must ride in the region between rows. The tire width of such tractors is generally sufficiently large that only a slight lateral steering of the tractor is possible before the wheels travel partially or fully into the rows.

It is known to adjust the cross conveyor in a manner whereby the potatoes can be discharged into rows at different lateral locations, thereby permitting the tractor to travel in a straight line with the tires between adjacent rows. This adjustment is in one known form effected by changing the lateral inclination of the cross conveyor. As the angle of the cross conveyor increases to effectively elevate the discharge end, the discharge end shifts laterally inwardly relative to the tractor. While this alleviates the above problem to a certain extent, the resulting discharge of potatoes becomes less precise. That is, the potatoes discharge from a greater height and may bounce off of each other and the underlying terrain, as a result of which the potatoes may be deposited on a wider lateral strip. As a consequence, some of the discharged potatoes may not be picked up by a windrower or harvester in a following pass.

It is also known to construct cross conveyors in a manner that they can be manually released and re-mounted in a laterally shifted position to account for row spacing deviations. However, it is not common that row spacing deviation is consistent over a sufficient area to make this exercise practical. Given fluctuations in row spacing, were this adjustment technique practiced, it would be required that the operator repeatedly stop the tractor and make numerous adjustments to accommodate the field conditions. This would be a difficult and time consuming exercise, as a consequence of which most operators will take other steps to accommodate the deviations from the consistent row spacing. Most commonly, the attempted solution is to steer the tractor laterally as dictated by the particular spacing deviation. The ability to do so is limited and may lead to either ineffective compensation or the undesired drifting of the tractor wheels directly into the rows.

The industry has contended with the above problems since there has been lacking a cross conveyor construction that will allow straight travel by a tractor and can be adjusted as the tractor is advancing to compensate for deviating row spacing and cause precise discharge of potatoes between rows.

SUMMARY OF THE INVENTION

In one form, the invention is directed to a windrower with a frame that has a front, a rear and laterally spaced sides and can be moved in an advancing direction parallel to field rows in underlying terrain in which a harvestable product is grown. A processing mechanism is provided on the frame. The processing mechanism is capable of unearthing grown product and separating foreign matter from the grown product as the frame is moved in the advancing direction. The windrower further has a cross conveyor assembly for controllably discharging grown product from the processing mechanism to the underlying terrain at different selectable lateral discharge locations. The cross conveyor assembly has a first discharge end and at least one section, including the first discharge end, that is selectively translatable laterally relative to the frame as the frame is advancing, thereby to laterally change a location of the first discharge end and thus the lateral discharge location for the cross conveyor assembly at the first discharge end.

In one form, the at least one section is made up of a main conveyor portion with laterally spaced ends and a first discharge portion at one of the ends of the main conveyor portion. The first discharge portion is mounted for movement relative to the main conveyor portion and defines the first discharge end. Grown product from the processing mechanism is advanced laterally: a) by the main conveyor portion in one lateral direction to the first discharge portion; and b) by the first discharge portion to and from the first discharge end to the underlying terrain.

In one form, the first discharge portion is connected to the main conveyor portion for pivoting movement around an axis that extends generally in a fore-and-aft direction.

In one form, the at least one section further has a second discharge portion at the other end of the main conveyor portion with a second discharge end. The windrower is selectively operable in first and second different states. In the first state, grown product from the processing mechanism is advanced in the first lateral direction. With the windrower in the second state, grown product from the processing mechanism is advanced laterally: a) by the main conveyor portion oppositely to the one lateral direction to the second discharge portion; and b) by the second discharge portion to and from the second discharge end to the underlying terrain.

In one form, the main conveyor portion and first and second discharge portions are movable laterally as one piece relative to the frame.

In one form, the cross conveyor assembly has a sub-frame and there is a first extendable repositioning unit that connects between the frame and sub-frame and is reconfigurable to shift the sub-frame laterally relative to the frame to thereby laterally move the at least one section relative to the frame.

In one form, the main conveyor portion has a generally flat conveyor surface that is substantially level in a lateral direction and declines in a front-to-rear direction.

In one form, there is a single product conveying assembly that is trained continuously around the main conveyor portion and first and second discharge portions.

In one form, there are first and second drives for the product conveying assembly respectively on the first and second discharge portions.

In one form, there is a second extendable repositioning unit that connects between the sub-frame and first discharge portion and is reconfigurable to move the first discharge portion relative to the sub-frame.

In one form, the first discharge portion is movable relative to the main conveyor portion to selectively raise and lower the first discharge end.

In one form, the cross conveyor assembly further includes a deflector plate that blocks migration of grown product on the cross conveyor assembly to between the first discharge portion and main conveyor portion in a fore-and-aft direction.

In one form, the product conveying assembly defines a conveying surface with openings through which foreign matter separated from grown product can pass to the underlying terrain.

In one form, the product conveying assembly has a length and the conveying surface is defined cooperatively by a plurality of elongate rods each with a length extending generally in a fore-and-aft direction and spaced at regular intervals along the length of the product conveying assembly.

The invention is also directed to a method of windrowing a grown product in parallel field rows. The method includes the steps of: providing a windrower having: a) a frame with a front and rear and laterally spaced sides; b) a processing mechanism; and c) a cross conveyor assembly having a section with a first discharge end; advancing the windrower in a first direction; through the processing mechanism: i) unearthing grown product from a plurality of the field rows; ii) separating foreign matter from the grown product; and iii) delivering the grown product to the cross conveyor assembly; moving the section laterally as the windrower is advancing thereby to place the first discharge end at a desired lateral location; and discharging grown product to underlying terrain through the cross conveyor assembly at the first discharge end.

In one form, the step of moving the section laterally involves translating the section laterally along a substantially horizontal line.

In one form, the section has a main conveyor portion with laterally spaced ends and a first discharge portion at one of the ends of the main conveyor portion and defining the first discharge end. The method further includes the step of moving the first discharge portion relative to the main conveyor portion.

In one form, the step of moving the first discharge portion involves moving the first discharge portion relative to the main conveyor portion to thereby selectively raise and lower the first discharge end.

In one form, the section further has a second discharge portion at the other end of the main conveyor portion and defining a second discharge end.

In one form, the method includes the step of selectively changing the windrower between first and second states. With the windrower in the first state, grown product is advanced by the cross conveyor assembly in a first lateral direction to discharge at the first discharge end. With the windrower in the second state, grown product is advanced by the cross conveyor assembly in a lateral direction opposite to the first lateral direction to discharge at the second discharge end.

In one form, the invention is directed to a combination including a windrower with a frame that has a front, a rear and laterally spaced sides and can be moved in an advancing direction parallel to field rows in underlying terrain in which a harvestable product is grown. A processing mechanism is provided on the frame. The processing mechanism is capable of unearthing grown product and separating foreign matter from the grown product as the frame is moved in the advancing direction. The windrower further has a cross conveyor assembly for controllably discharging grown product from the processing mechanism to the underlying terrain at different selectable lateral discharge locations. The cross conveyor assembly has a first discharge end and at least one section, including the first discharge end, that is translatable laterally relative to the frame thereby to laterally change a location of the first discharge end and thus the lateral discharge location for the cross conveyor assembly at the first discharge end. The combination further includes a towing vehicle for advancing the windrower and a control that is operable by an operator from the towing vehicle to thereby selectively laterally translate the at least one section relative to the frame.

BRIEF DESCRIPTION OF THE DRAWINGS

FIG. 8 is a plan view of the cross conveyor assembly;

FIG. 9 is a front elevation view of the cross conveyor assembly;

DETAILED DESCRIPTION OF THE PREFERRED EMBODIMENT

Figure 1:
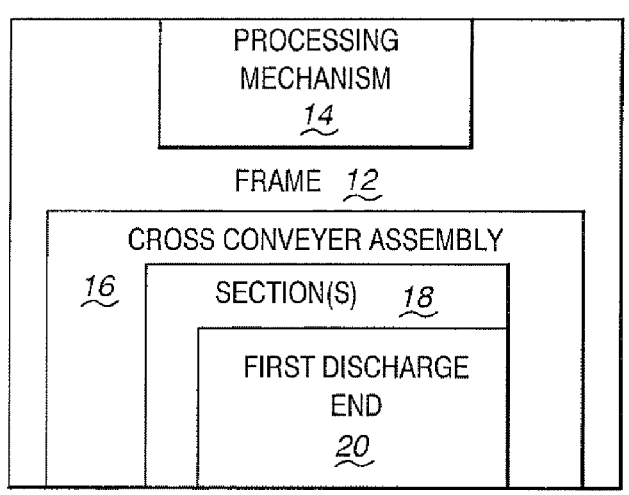
FIG. 1 is a schematic representation of a windrower, according to the present invention, and made up of a frame upon which a processing mechanism and cross conveyor assembly are provided.

In FIG. 1, a windrower, according to the present invention, is shown schematically at 10. The windrower 10 has a frame 12 that: a) has a front, a rear, and laterally spaced sides; and b) is designed to be moved in an advancing direction parallel to field rows in underlying terrain in which a harvestable product is grown.

A processing mechanism 14 is provided on the frame 12. The processing mechanism 14 is capable of: a) unearthing grown product; and b) separating foreign matter from the grown product as the frame 12 is moved in the advancing direction.

A cross conveyor assembly 16 is provided at the rear of the frame 12 for controllably discharging grown product from the processing mechanism 14 to the underlying terrain at different selectable lateral discharge locations. The cross conveyor assembly 16 has at least one section 18 that is translatable laterally relative to the frame 12. This movement laterally changes a location of at least a first discharge end 20 on the section 18, thereby to change a lateral discharge location for product on the cross conveyor assembly 16 at the first discharge end 20 relative to the frame 12.

The windrower 10 is shown in schematic form since it is intended to encompass components with virtually a limitless number of structural variations. As one example, processing mechanisms currently take many different forms, none of which is critical to the present invention. All that is required is that there be a transfer of the grown product, after the same has been unearthed, to the cross conveyor assembly 16, through which the grown product will be discharged at the first discharge end 20.

Likewise, the cross conveyor assembly can have myriad different constructions, consistent with the invention herein. The schematic showing of this and other components is intended to encompass all such variations.

One specific form of the windrower 10 will now be described with respect to FIGS. 2-19. The frame 12 is supported on wheels 22 at the rear 24 of the frame 12. A hitch 26 is provided at the front 28 of the frame 12. The hitch 26 is releasably connected to a towing vehicle 30 through which the windrower 10 is drawn in an advancing direction, as indicated by the arrow 32. The operating components on the windrower 10 are driven by a power take-off 34 on the towing vehicle 30. Connection between the power take-off 34 and the windrower 10 is effected through a shaft 36. Among the components driven by the power take-off 34 are a conveying assembly/web 38 on a primary conveyor section 40, a conveying assembly/web 42 on a secondary conveyor/section 44, and a product conveying assembly/web 46, that is part of the cross conveyor assembly 16.

Each of the conveying assemblies/webs 38, 42 has a conventional construction, with the exemplary conveying assembly/web 38 consisting of a plurality of continuous, laterally spaced belts 48 mounted to travel guidingly around rollers 49 in an endless path. Laterally extending, elongate, rods 50 are connected between the belts 48 at regularly spaced, circumferential intervals. The rods 50 cooperatively define an upwardly facing conveying surface 51 that moves from front to rear, oppositely to the advancing direction for the windrower 10 as the windrower 10 is operated.

in operation, as the windrower 10 is moved in the advancing direction, digger nose assemblies 52 dig the grown product, such as potatoes, simultaneously from a plurality of regularly spaced growing rows R. The unearthed product is advanced by the primary conveyor section 40 towards the secondary conveyor section 44. This advancing action is effected by the moving rods 50 on the conveyor assembly/web 38. Loose dirt on the grown product is allowed to sift through openings 54 between adjacent rods 50.

At the downstream end 56 of the primary conveyor section 40, the grown product is transitioned to the secondary conveyor section 44. The conveyor sections 40, 44 are situated so that the grown product drops down onto the conveyor assembly/web 42 of the secondary conveyor section 44 from the downstream end 56 of the primary conveyor section 40. This is made possible by having the primary conveyor section 40 in a tilted orientation whereby the grown product ascends as it moves from front to rear on the windrower 10.

The secondary conveyor section 44 directs the grown product from the primary conveyor section 40 likewise in an ascending path from front to rear using a corresponding web construction with laterally extending and spaced, elongate rods 58 between which separated dirt is allowed to pass to be deposited to the underlying terrain. At the downstream, discharge end 60 of the secondary conveyor section 44, grown product is dropped onto the product conveying assembly/web 46 on the rear cross conveyor assembly 16.

As noted above, the details of the processing mechanism 14 are not critical to the present invention. It suffices to say that the unearthed grown product is cleared of much of the initially adhered dirt and vines by causing the same to be moved by at least the conveying assemblies/webs 38, 42 and product conveying assembly/web 46. By causing the grown product to drop as it is transitioned between the primary conveyor section 40 and secondary conveyor section 44, and secondary conveyor section 44 and rear cross conveyor assembly 16, dirt clods adhering to the grown product tend to break loose so that the grown product may be relatively clear of dirt and vines as it reaches, and is advanced by, the cross conveyor assembly 16.

The cross conveyor assembly 16 consists of a main conveyor portion 62 with first and second laterally spaced ends 64, 66. A first discharge portion 68 is provided at the first end 64 of the main conveyor portion 62, with a second discharge portion 70 at the second end 66. The first discharge end 20 of the cross conveyor assembly 16 is defined by the first discharge portion 68, with the second discharge portion 70 defining a second discharge end 72.

The cross conveyor assembly 16 has a sub-frame 74 consisting of elongate, front and rear side members 76, 78, respectively. A series of laterally spaced spreader tubes 80 (one shown in FIG. 7) maintains a uniform fore-and-aft spacing S between the front and rear side members 76, 78 over their co-extensive lateral dimension. A PVC sleeve 82 surrounds each spreader tube 82 to define a low friction surface that resists material build-up during operation.

The discharge portions 68, 70 have substantially the same construction, with each being a mirror image of the other. Exemplary discharge portion 70 consists of front and rear side members 84, 86 joined by spreader tubes 80 surrounded by sleeves 82.

The discharge portion 70 is mounted to the sub-frame 74 for pivoting movement around an axis 88 that extends in a fore-and-aft direction. This mounting is effected through hanger brackets 90, 92, respectively mounted one each to the sub-frame members 76, 78. The bracket 90 has an opening 94 to receive a stub shaft 96 on the member 84. The bracket 92 has a stub shaft 98 that projects into an opening 100 in the member 86. The stub shafts 96, 98 and openings 94, 100 cooperate to guide the discharge portion 70 in movement relative to the sub-frame 74 around the axis 88.

Figure 17:
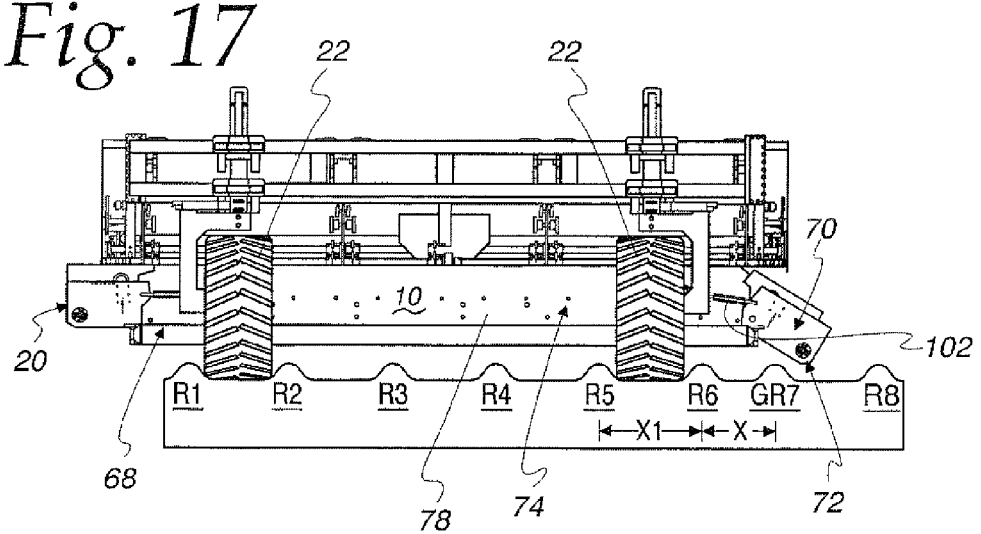
FIG. 17 is a view as in FIG. 16 wherein the guess row and outer row are spaced a distance less than the spacing between the rows that are windrowed and the cross conveyor assembly is shifted to the left from the FIG. 16 position.
Figure 19:
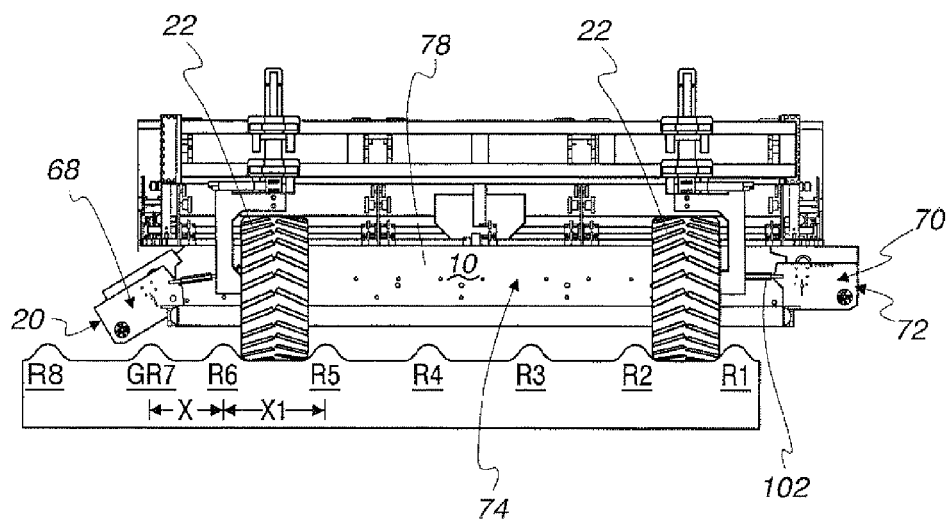
FIG. 19 is a view as in FIG. 18 wherein the guess row is spaced from the outer row a distance less than a distance between rows that are windrowed and the cross conveyor assembly is shifted to the right from the FIG. 18 position.

An extendable repositioning unit 102, in this embodiment in the form of an hydraulic cylinder, is connected between the sub-frame 74 and discharge portion 70 and is reconfigurable by lengthwise extension and retraction of a rod 103 to pivot the discharge portion 70 between a fully raised position, as shown in FIG. 19, and a fully lowered position, as shown in FIG. 17. This action correspondingly raises and lowers the discharge end 72.

With the discharge portion 70 in a lowered position, upwardly opening, V-shaped gaps G are formed between the members 78, 86 at the rear of the cross conveyor assembly 16 and the members 76, 84 at the front of the cross conveyor assembly 16. To block migration of grown product in a fore-and-aft direction through these gaps G, deflector plates 104, 106 are respectively mounted on the members 76, 78 to fill these gaps.

A plurality of front guide rollers 108 are provided adjacent to the bottom of the main conveyor portion 62 and the discharge portions 68, 70 to guide movement of the product conveying assembly/web 46 in a predetermined, continuous path. These rollers 108 are provided on the front member 76 on the main conveyor portion 62 as well as the front member 84 on the discharge portion 70 and a corresponding front member 84' on the discharge portion 72. A similar arrangement of the rollers 108 is provided on the rear member 78 on the main conveyor portion 62 as well as on the rear member 86 on the discharge portion 84 and a corresponding member 86' on the discharge portion 68.

The separate sets of rollers 108 at the front and rear of the cross conveyor assembly 16 collectively each defines an endless path for separate, spaced belts B at the front and rear of the cross conveyor assembly 16. The product conveying assembly/web 46 consists of these two belts B (one shown in FIG. 6) and elongate rods 110 spanning in a fore-and-aft direction therebetween at spaced intervals around the circumference of the product conveying assembly/web 46, to function as the aforementioned conveyor assembly/webs 38, 42. A single product conveying assembly/web 46 is shown extending continuously around the main conveyor portion 62 and first and second discharge portions 68, 70, though this is not required. The elongate rods 110, moving in a lateral direction, advance grown product supported thereon as the windrower 10 is operated. Spaces 112 between the elongate rods 110 allow passage of foreign matter that breaks loose from the grown product as the grown product is advanced.

Adjacent to the discharge end 72 on the discharge portion 70, a shaft 114 is directed through the members 84, 86. Sprockets 116 are mounted on the shaft 114 adjacent to the front and rear members 84, 86. The belts B on the product conveying assembly/web 46 are wrapped against the sprockets 116. A drive, in the form of an hydraulic motor 118, turns the shaft 114 and thereby advances the product conveying assembly/web 46 through the sprockets 116. A similar arrangement of components is provided on the discharge portion 68, which has a separate drive 118' that functions the same as the drive 118.

The cross conveyor assembly 16 is mounted operatively upon the frame 12 through a hanger assembly 120. The hanger assembly 120 consists of laterally spaced primary support members 122, 124 that are fixed together by spanning front and rear spacing elements 126, 128 to define a unitary frame 129. A support roller 130 is provided at the rear of the unitary frame 129.

The front region of the unitary frame 129 is mounted to the frame 12 for pivoting movement around a laterally extending axis 132.

The rear of the unitary frame 129 is supported by a pair of laterally spaced arms 134 of like construction. Each arm 134 is pivotably mounted at its ends to the frame 12 and the unitary frame 129. Each arm 134 incorporates an hydraulic cylinder 136 that can be operated to change the effective length of the arm 134. By so doing, the angular position of the unitary frame 129 is changed.

The members 76, 78 on the main conveyor portion 62 are supported upon the hanger assembly 120 atop the support members 122, 124. Plastic slides 138 are interposed between the members 76, 78 and the members 122, 124 to smoothly guide translation of the combined conveyor portions 62, 68, 70 as a unit in a lateral direction relative to the frame 12.

Normally, the hanger assembly 120 is configured so that a generally flat conveyor surface 140, defined cooperatively by the elongate rods 110, is substantially level in a lateral direction and declines in a front-to-rear direction. Accordingly, grown product delivered to the cross conveyor assembly 16 moves rearwardly under its weight towards a forwardly facing surface 142 on the rear member 78. To avoid shifting of grown product off of the cross conveyor 16 in the rearward direction, the rear member 78, and the surface 142 thereon, are made with a vertically extended height H, compared to a corresponding height H1 for the front member 76. The members 86, 86' are made with the corresponding, vertically extended height H to effectively confine the grown product upon the cross conveyor assembly 16 as it shifts laterally towards discharge.

To control the lateral position of the entire unit, consisting of the main conveyor portion 62 and discharge portions 68, 70, an extendable repositioning unit, in the form of an hydraulic cylinder 144, is mounted between the sub-frame 74 on the main conveyor portion 62 and frame 12. Actuation of the cylinder 144 is carried out to translate the combined main conveyor portion and discharge portions 68, 70 as one piece selectively in opposite lateral directions with respect to the frame 12.

Figure 15:
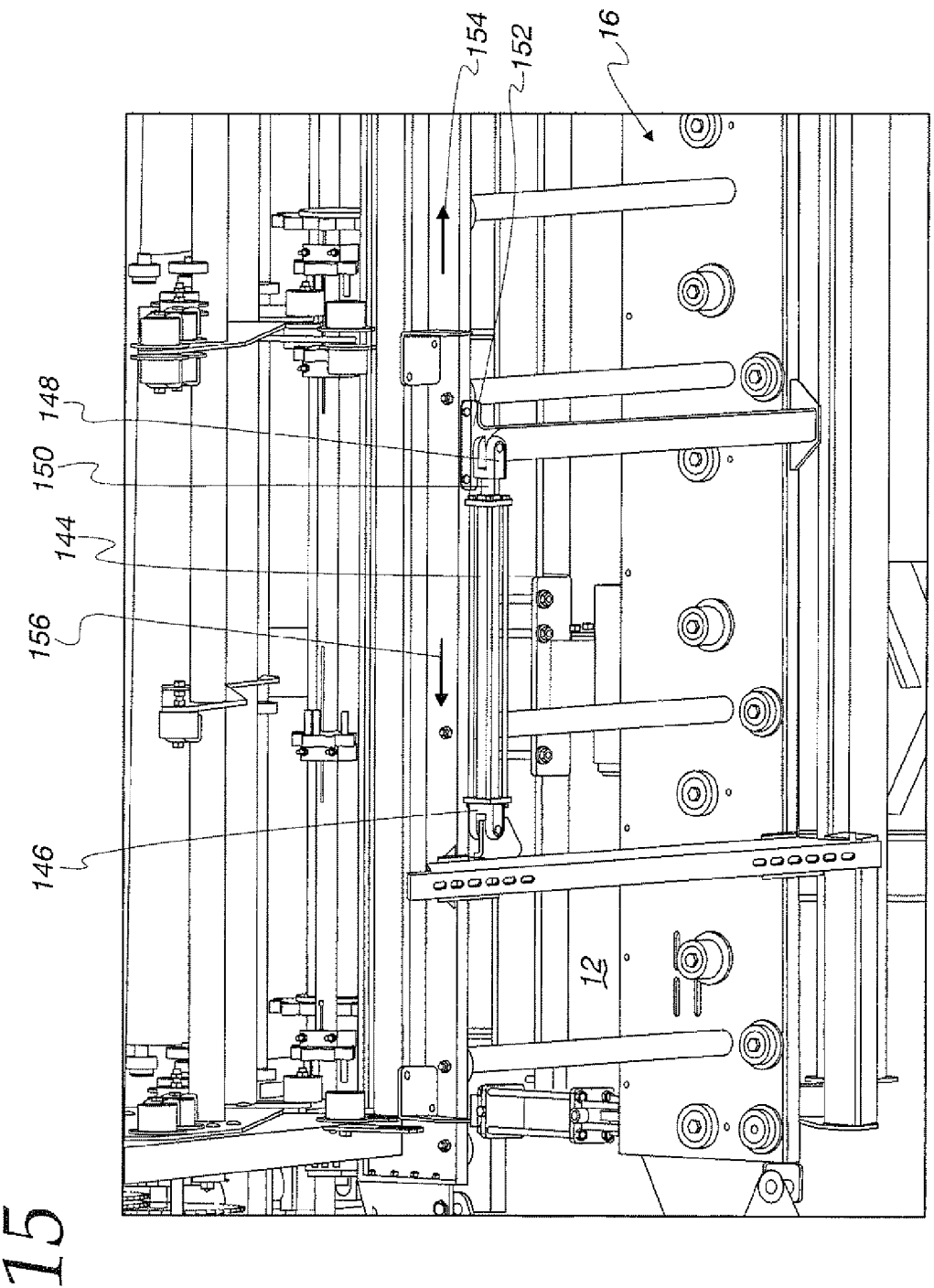
FIG. 15 is an enlarged, fragmentary, bottom perspective view of the windrower and with the cross conveyor assembly in the operative position upon the windrower frame.

More specifically, as can be seen in FIG. 15, one cylinder end 146 is fixed to the frame 12, with a fitting 148 at the other end of the cylinder, on the end of an extendable rod 150, connected through a bracket 152 to the sub-frame 74 on the main conveyor portion 62.

Operation of the cylinder 144 to extend the rod 150 causes the sub-frame 74 to shift/translate laterally along a substantially horizontal line in the direction of the arrow 154 in FIG. 15. Retraction of the rod 150 shifts/translates the sub-frame 74 laterally oppositely, along a substantially horizontal line in the direction of the arrow 156.

Figure 16:
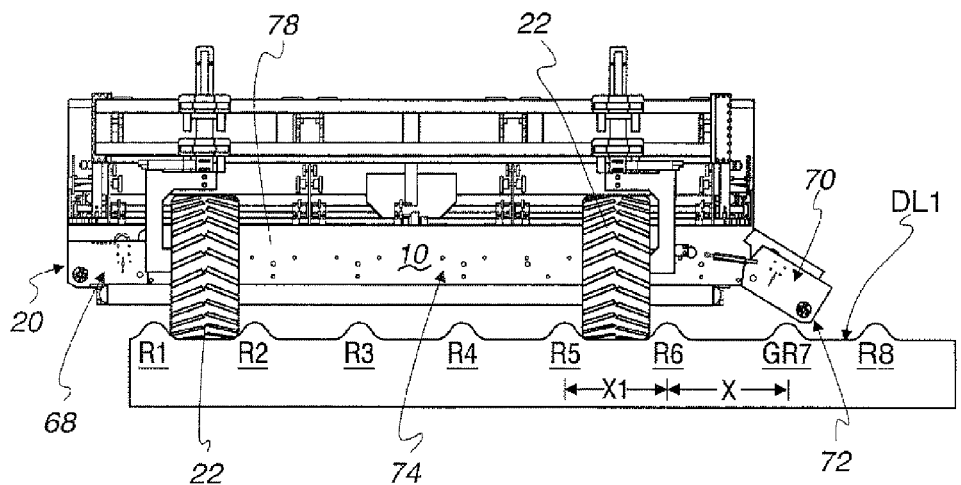
FIG. 16 is a rear elevation view of the windrower in a state wherein the cross conveyor assembly is discharging to the right between a guess row and outer row, with the guess row spaced further from an outermost row than the spacing between rows that are windrowed.

Through an appropriate control 158, operation of the system components, namely the drives 118, 118', cylinders 102, 144, etc. is carried out in coordinated fashion. Through coordinated operation, the windrower 10 can be operated in different states, as explained below. The control 158 is preferably operable as from within the towing vehicle 30 as the towing vehicle 30 is advancing the windrower 10 to laterally shift the sub-frame 74 as appropriate to accommodate the potentially varying row spacing deviation throughout the entire expanse of a field. The control may incorporate an actuator in the towing vehicle that is manually operated by a user or automatically responds to a signal that results from detection of row spacing changes.

in each of FIGS. 16 and 17, the windrower 10 is configured to discharge grown product to the right. As depicted, there are six rows, identified as R1 through R6 from which grown product is being windrowed. The windrowed product is being placed between the "guess row" GR7 and the eighth row R8. In FIG. 16, the guess row GR7 is spaced from the sixth row R6 a distance X that is greater than the regular spacing X1 between each of the adjacent rows R1-R6. To accommodate this field condition and discharge the grown product at a discharge location DL1 between rows GR7 and R8, the sub-frame 74, and thus the main conveyor portion 62 and discharge portions 68, 70, are shifted as one piece from left to right relative to the frame 12 so that the lowered discharge end 72 on the discharge portion 70 is directly over the location DL1.

In FIG. 17, the field condition is shown wherein the distance X is less than the distance X1. To accommodate this condition, the sub-frame 74 is shifted to a left-most position.

The cross conveyor assembly 16 is constructed so that preferably with the row distances X and X1 equal, the condition would be accommodated by locating the sub-frame 74 laterally mid-way between the FIG. 16 and FIG. 17 positions.

With both of these arrangements, the grown product is advanced from left to right laterally to the discharge portion 70 and through the second discharge portion 70 to and from the second discharge end 72 to the underlying terrain at the location DL1.

Figure 18:
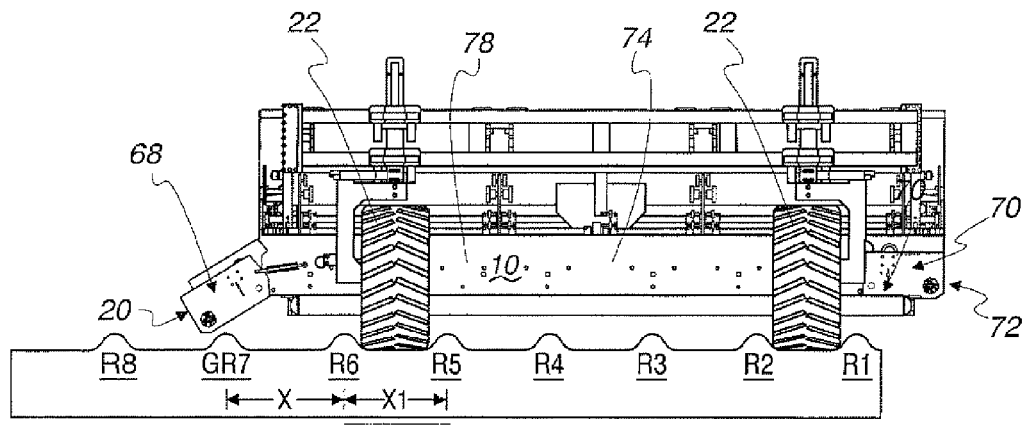
FIG. 18 is a view as in FIGS. 16 and 17 wherein the windrower is configured to discharge to the left side thereof and with the guess row spaced from the outer row a distance greater than the distance between rows that are windrowed.

FIGS. 18 and 19 correspond to FIGS. 16 and 17 for a left-hand discharge. That is, FIG. 18 corresponds to FIG. 16 and the field condition wherein the guess row GR7 is spaced laterally outwardly from the last row R6 a greater distance than the regular interval spacing X1 for the rows R1-R6 that are being windrowed. FIG. 19 corresponds to FIG. 17 and depicts the field condition wherein the guess row GR7 is closer to the last row R6 than the regular interval spacing X1 between the rows R1-R6 that are being windrowed. FIG. 18 represents the left-most position for the sub-frame 74, with FIG. 19 representing the right-most position therefor with a left-hand discharge. With the guess row GR7 at the regular interval spacing X1, the sub-frame 74 would be laterally positioned between the location shown in FIGS. 18 and 19, and preferably mid-way therebetween.

Figure 20:
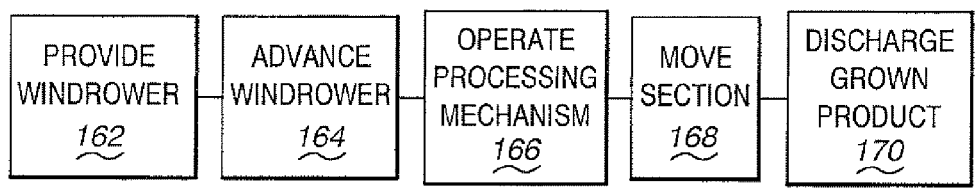
FIG. 20 is a flow diagram representation of a method of windrowing a grown product, according to the present invention.
Figure 2:
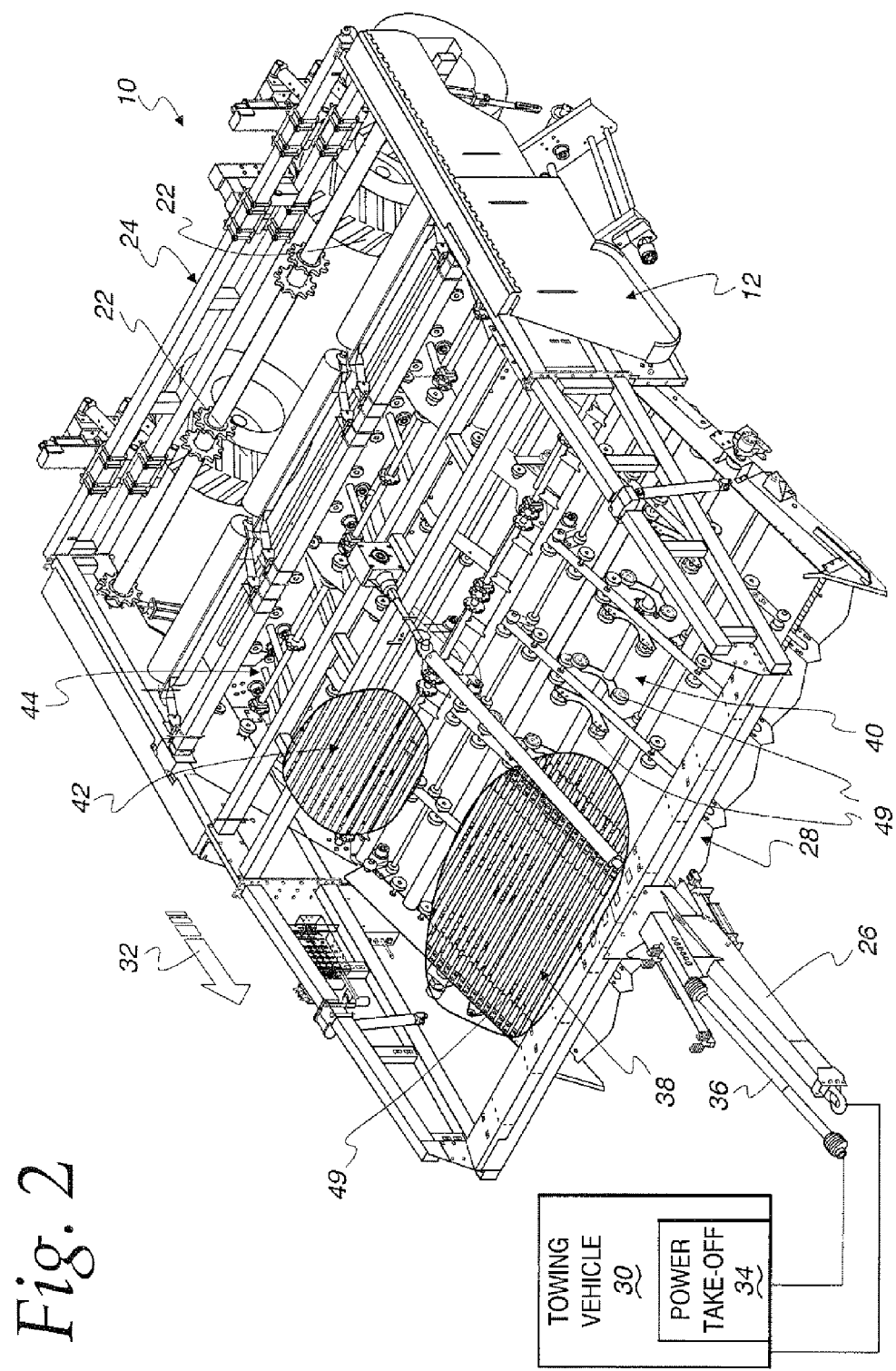
FIG. 2 is a front perspective view of one specific form of windrower, made according to the present invention, as shown in schematic form at FIG. 1, and with web components defining conveying surfaces for product removed.
Figure 3:
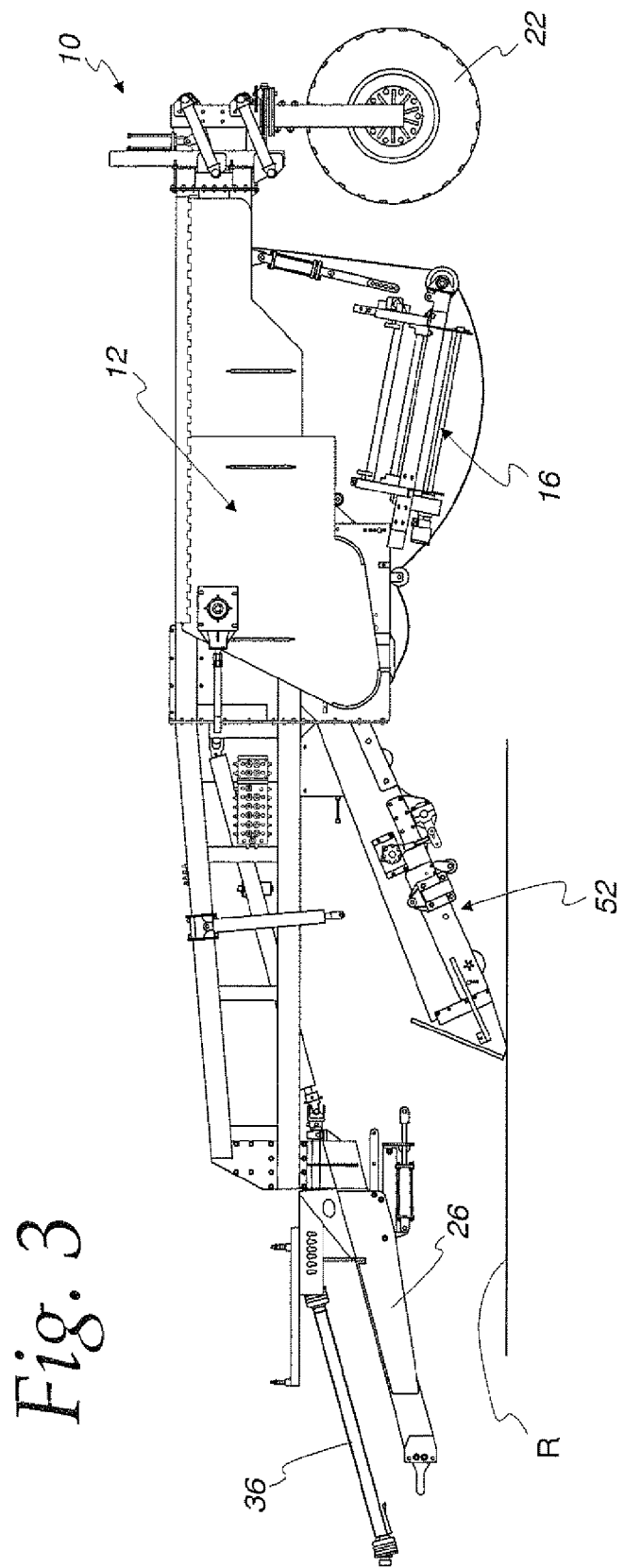
FIG. 3 is a side elevation view of the windrower in FIG. 2.
Figure 4:
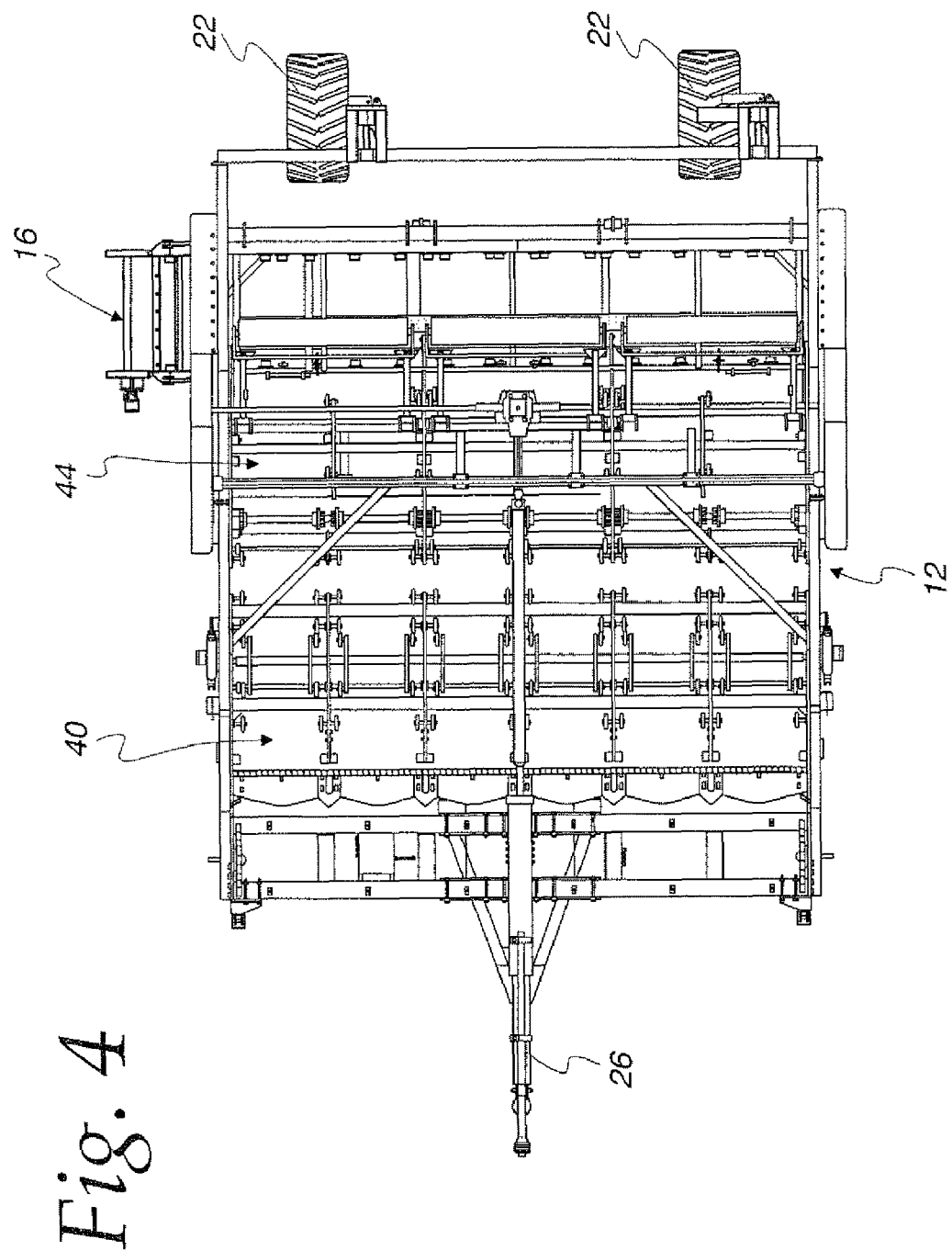
FIG. 4 is a reduced, plan view of the windrower in FIGS. 2 and 3.
Figure 5:
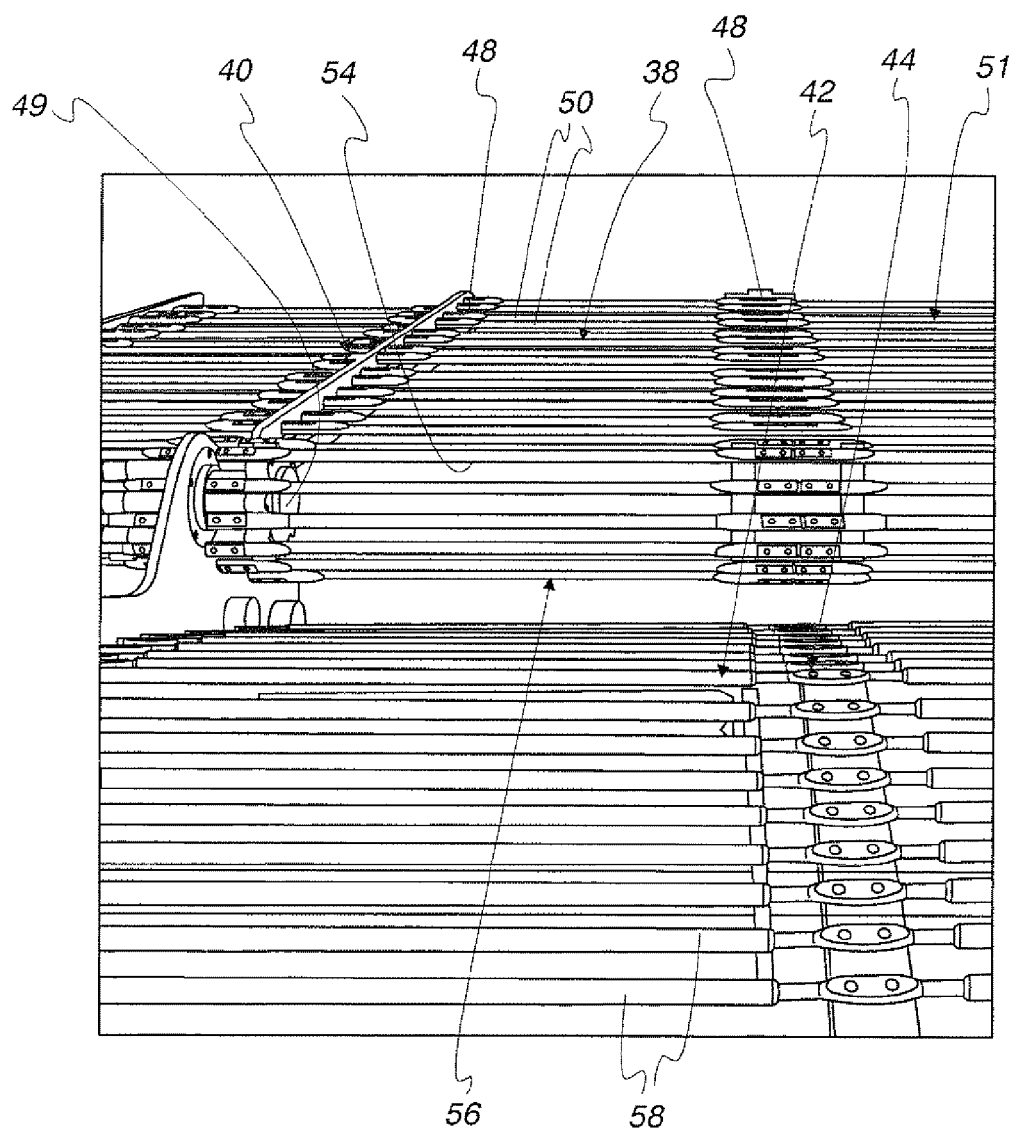
FIG. 5 is an enlarged, fragmentary, rear elevation view of primary and secondary conveyor sections, making up the processing mechanism on the windrower in FIGS. 2-4.
Figure 6:
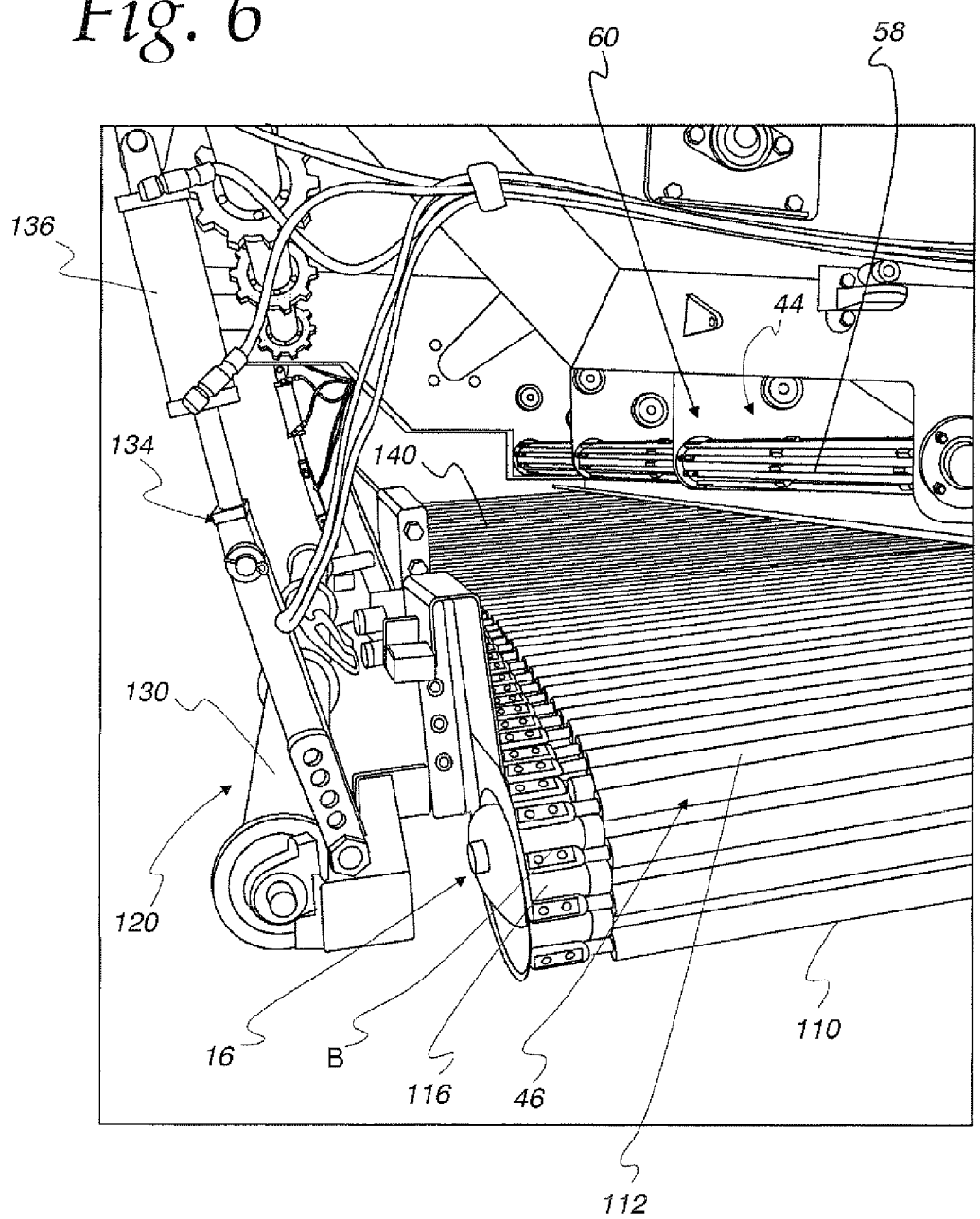
FIG. 6 is an enlarged, fragmentary, side perspective view of the windrower in FIGS. 2-5 and showing the cross conveyor assembly.
Figure 7:
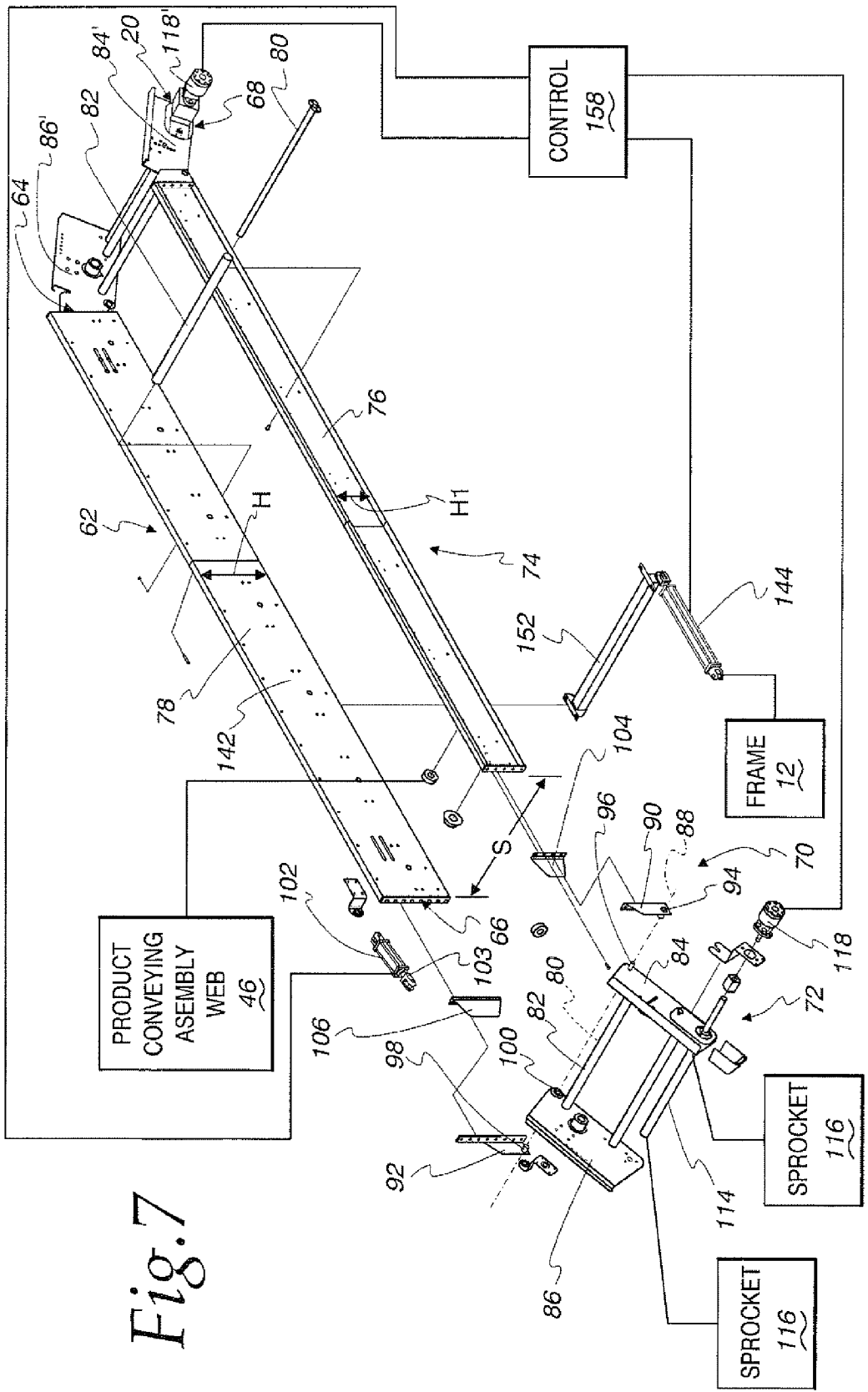
FIG. 7 is an exploded, perspective view of the cross conveyor assembly.
Figure 10:
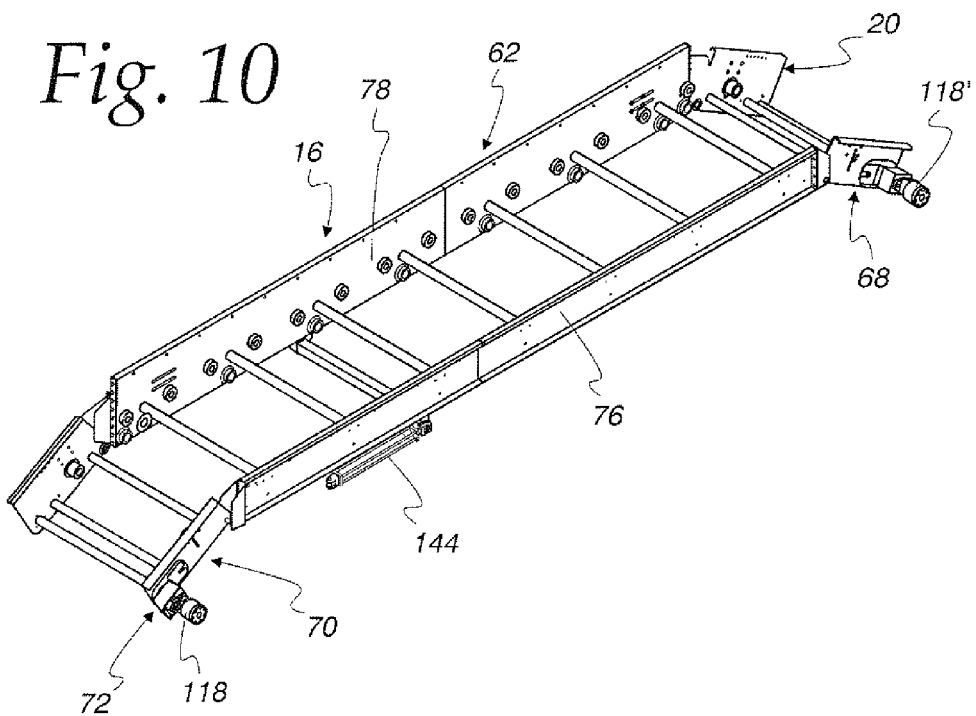
FIG. 10 is a front perspective view of the cross conveyor assembly.
Figure 11:
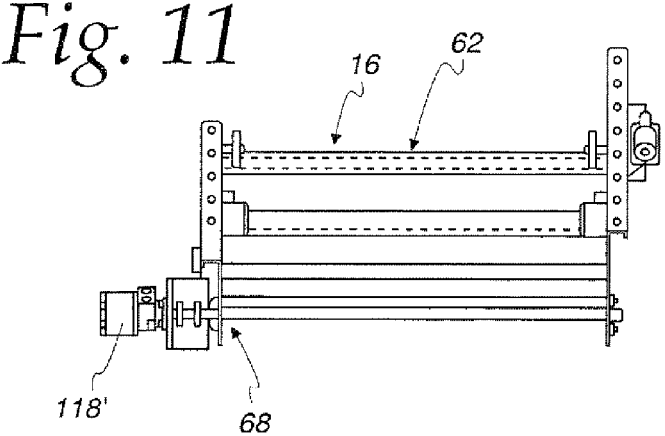
FIG. 11 is a side elevation view of the cross conveyor assembly.
Figure 12:
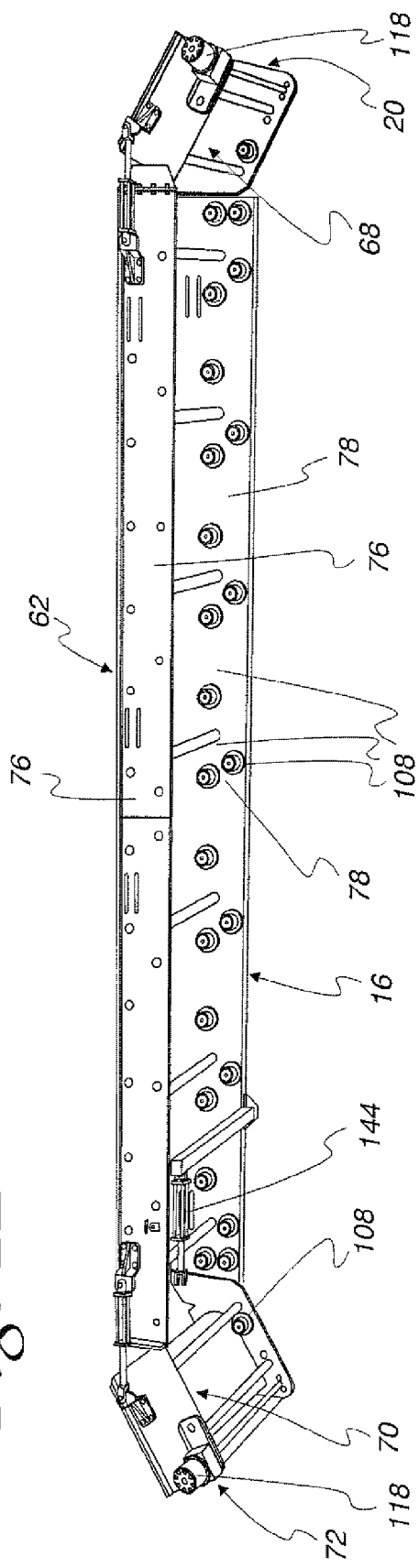
FIG. 12 is a bottom perspective view of the cross conveyor assembly.
Figure 13:
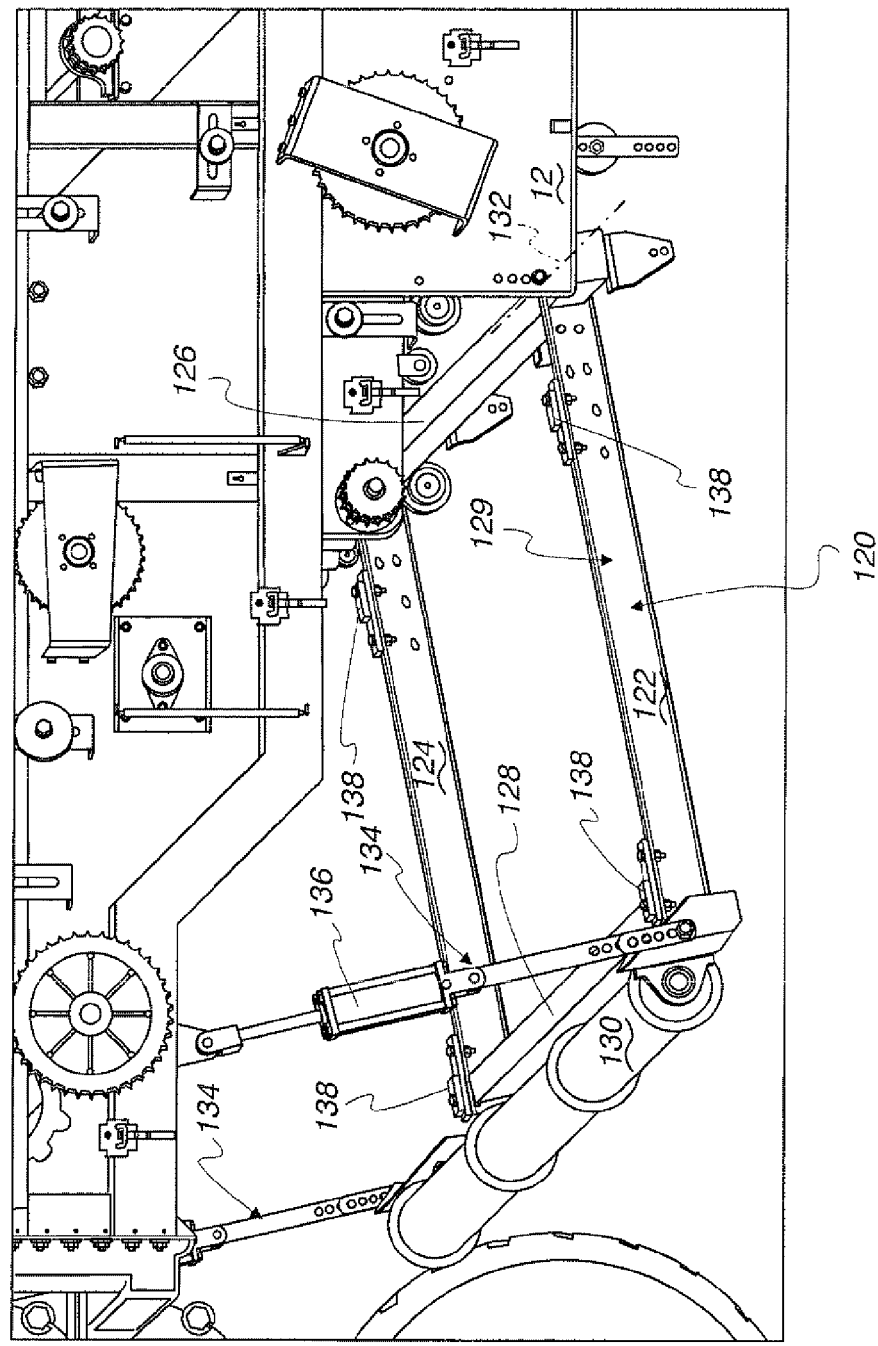
FIG. 13 is an enlarged, fragmentary, perspective view of the windrower and showing a hanger assembly through which the cross conveyor assembly is supported on the frame of the windrower.
Figure 14:
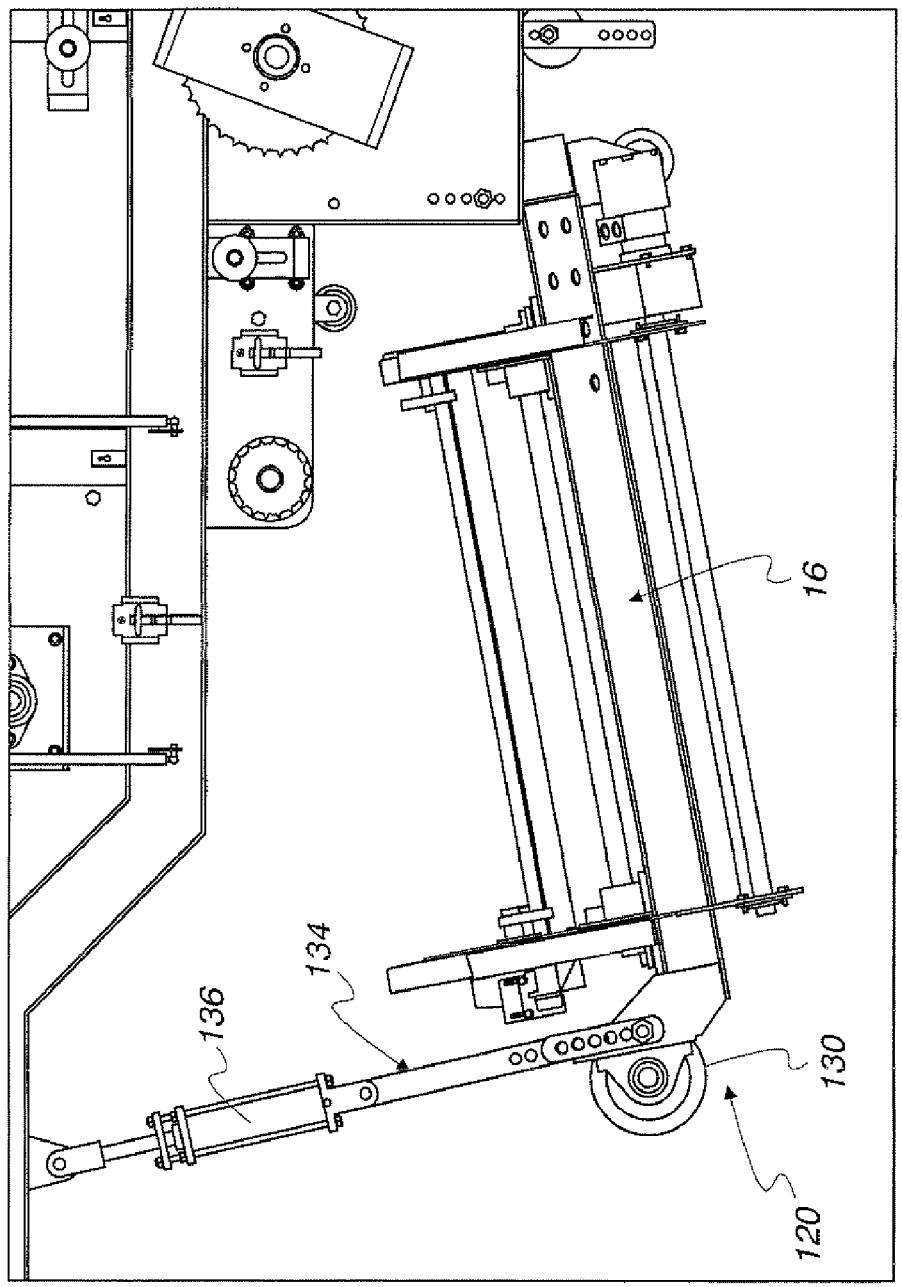
FIG. 14 is an enlarged, fragmentary, side elevation view of the windrower and showing the cross conveyor assembly upon the hanger assembly and in an operative position on the windrower frame.

In FIG. 20, a method of windrowing a grown product in parallel field rows, according to the present invention, is shown in schematic form. As shown at block 162, a windrower is provided having: a) a frame with a front and rear and laterally spaced sides; b) a processing mechanism; and c) a cross conveyor assembly having a section with a first discharge end. As shown at block 164, the windrower is advanced in a first direction. As shown at block 166, the processing mechanism is operated to: i) unearth grown product from a plurality of the field rows; ii) separate foreign matter from the grown product; and iii) deliver the grown product to the cross conveyor assembly. As shown at block 168, a section on the windrower is moved laterally as the windrower is advancing to place the first discharge end at a desired lateral location. As shown at block 170, the grown product is discharged to underlying terrain through the cross conveyor assembly at the first discharge end.

The foregoing disclosure of specific embodiments is intended to be illustrative of the broad concepts comprehended by the invention.

What is claimed is:

1. A windrower comprising:
    a frame that: a) has a front, a rear and laterally spaced sides; and b) can be moved in an advancing direction parallel to field rows in underlying terrain in which a harvestable product is grown;
    a processing mechanism on the frame,
    the processing mechanism capable of: a) unearthing grown product; and b) separating foreign matter from the grown product as the frame is moved in the advancing direction; and
    a cross conveyor assembly for controllably discharging grown product from the processing mechanism to the underlying terrain at different selectable lateral discharge locations,
    the cross conveyor assembly having a first discharge end,
    the cross conveyor assembly having at least one section, including the first discharge end, that is selectively translatable laterally relative to the frame along a substantially horizontal line as the frame is advancing thereby to laterally change a location of the first discharge end and thus the lateral discharge location for the cross conveyor assembly at the first discharge end.

2. The windrower according to claim 1 wherein the at least one section comprises a main conveyor portion with laterally spaced ends and a first discharge portion at one of the ends of the main conveyor portion that is mounted for movement relative to the main conveyor portion and defines the first discharge end, grown product from the processing mechanism advanced laterally: a) by the main conveyor portion in one lateral direction to the first discharge portion; and b) by the first discharge portion to and from the first discharge end to the underlying terrain.

3. The windrower according to claim 2 wherein the first discharge portion is connected to the main conveyor portion for pivoting movement around an axis that extends generally in a fore-and-aft direction.

4. The windrower according to claim 2 wherein the at least one section comprises a second discharge portion at the other end of the main conveyor portion with a second discharge end, the windrower selectively operable in first and second different states and in the first state causing grown product from the processing mechanism to be advanced in the first lateral direction, with the windrower in the second state grown product from the processing mechanism is caused to be advanced laterally: a) by the main conveyor portion oppositely to the one lateral direction to the second discharge portion; and b) by the second discharge portion to and from the second discharge end to the underlying terrain.

5. The windrower according to claim 4 wherein the main conveyor portion and first and second discharge portions are movable laterally as one piece relative to the frame.

6. The windrower according to claim 1 wherein the cross conveyor assembly has a sub-frame and there is a first extendable repositioning unit that connects between the frame and sub-frame and is reconfigurable to shift the sub-frame laterally relative to the frame to thereby laterally move the at least one section relative to the frame.

7. The windrower according to claim 2 wherein the main conveyor portion has a generally flat conveyor surface that is substantially level in a lateral direction and declines in a front-to-rear direction.

8. The windrower according to claim 4 wherein there is a single product conveying assembly that is trained continuously around the main conveyor portion and first and second discharge portions.

9. The windrower according to claim 8 wherein there are first and second drives for the product conveying assembly respectively on the first and second discharge portions.

10. The windrower according to claim 6 wherein there is a second extendable repositioning unit that connects between the sub-frame and first discharge portion and is reconfigurable to move the first discharge portion relative to the sub-frame.

11. The windrower according to claim 2 wherein the first discharge portion is movable relative to the main conveyor portion to selectively raise and lower the first discharge end.

12. The windrower according to claim 11 wherein the cross conveyor assembly further comprises a deflector plate that blocks migration of grown product on the cross conveyor assembly to between the first discharge portion and main conveyor portion in a fore-and-aft direction.

13. The windrower according to claim 8 wherein the product conveying assembly defines a conveying surface with openings through which foreign matter separated from grown product can pass to the underlying terrain.

14. The windrower according to claim 13 wherein the product conveying assembly has a length and the conveying surface is defined cooperatively by a plurality of elongate rods each with a length extending generally in a fore-and-aft direction and spaced at regular intervals along the length of the product conveying assembly.

15. A method of windrowing a grown product in parallel field rows, the method comprising the steps of:
providing a windrower comprising: a) a frame with a front and rear and laterally spaced sides; b) a processing mechanism; and c) a cross conveyor assembly having a section with a first discharge end;
advancing the windrower in a first direction;
through the processing mechanism: i) unearthing grown product from a plurality of the field rows; ii) separating foreign matter from the grown product; and iii) delivering the grown product to the cross conveyor assembly;
moving the section laterally along a substantially horizontal line as the windrower is advancing thereby to place the first discharge end at a desired lateral location; and
discharging grown product to underlying terrain through the cross conveyor assembly at the first discharge end.

16. The method of windrowing a grown product according to claim 15 wherein the step of moving the section laterally comprises translating the section laterally along a substantially horizontal line.

17. The method of windrowing a grown product according to claim 15 wherein the section comprises a main conveyor portion with laterally spaced ends and a first discharge portion at one of the ends of the main conveyor portion and defining the first discharge end and further comprising the step of moving the first discharge portion relative to the main conveyor portion.

18. The method of windrowing a grown product according to claim 17 wherein the step of moving the first discharge portion comprises moving the first discharge portion relative to the main conveyor portion to thereby selectively raise and lower the first discharge end.

19. The method of windrowing a grown product according to claim 17 wherein the section further comprises a second discharge portion at the other end of the main conveyor portion and defining a second discharge end.

20. The method of windrowing a grown product according to claim 19 further comprising the step of selectively changing the windrower between first and second states, with the windrower in the first state causing grown product to be advanced by the cross conveyor assembly in a first lateral direction to discharge at the first discharge end, and with the windrower in the second state causing grown product to be advanced by the cross conveyor assembly in a lateral direction opposite to the first lateral direction and to discharge at the second discharge end.

21. In combination:
a) a windrower comprising:
a frame that: a) has a front, a rear and laterally spaced sides; and b) can be moved in an advancing direction parallel to field rows in underlying terrain in which a harvestable product is grown;
a processing mechanism on the frame,
the processing mechanism capable of: a) unearthing grown product; and b) separating foreign matter from the grown product as the frame is moved in the advancing direction; and
a cross conveyor assembly for controllably discharging grown product from the processing mechanism to the underlying terrain at different selectable lateral discharge locations,
the cross conveyor assembly having a first discharge end,
the cross conveyor assembly having at least one section, including the first discharge end, that is translatable laterally relative to the frame along a substantially horizontal line thereby to laterally change a location of the first discharge end and thus the lateral discharge location for the cross conveyor assembly at the first discharge end;
b) a towing vehicle for advancing the windrower; and
c) a control that is operable by an operator from the towing vehicle to thereby selectively laterally translate the at least one section relative to the frame.

* * * * *